(12) United States Patent
Fukuta

(10) Patent No.: US 6,701,384 B1
(45) Date of Patent: Mar. 2, 2004

(54) IMAGE OUTPUT METHOD AND SYSTEM WITH A FUNCTION TO CHANGE A RECEIVED PRINT CONDITION

(75) Inventor: Shigenori Fukuta, Saitama-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/677,865

(22) Filed: Oct. 3, 2000

Related U.S. Application Data

(62) Division of application No. 09/020,234, filed on Feb. 6, 1998, now Pat. No. 6,173,338.

(30) Foreign Application Priority Data

Jan. 7, 1997 (JP) .............................. 9-038525

(51) Int. Cl.⁷ ...................... G06F 13/00; B41B 15/00
(52) U.S. Cl. ............................ 710/5; 710/6; 358/1.16; 358/1.17
(58) Field of Search .................. 710/5, 6, 12, 14, 710/20; 358/1.16, 1.17; 395/115, 116

(56) References Cited

U.S. PATENT DOCUMENTS

| 4,500,919 A | * | 2/1985 | Schreiber ..................... 358/518 |
| 4,819,077 A | | 4/1989 | Kikuchi et al. ............... 358/98 |
| 4,937,681 A | * | 6/1990 | Fujinawa et al. ........... 358/426 |
| 5,087,971 A | | 2/1992 | Sakata et al. ................ 358/160 |
| 5,485,554 A | | 1/1996 | Lowitz et al. ............... 395/116 |
| 5,502,580 A | | 3/1996 | Yoda et al. .................. 358/518 |
| 5,610,726 A | | 3/1997 | Nonoshita et al. .......... 358/442 |
| 5,724,443 A | * | 3/1998 | Nishikawa ................... 382/167 |
| 5,740,028 A | * | 4/1998 | Sugiyama et al. .......... 364/130 |
| 5,862,412 A | * | 1/1999 | Sugiyama .................... 395/888 |
| 5,892,844 A | | 4/1999 | Fujisawa ..................... 382/177 |
| 5,892,889 A | * | 4/1999 | Nishijima ................... 395/101 |
| 5,894,545 A | | 4/1999 | Fukuta ....................... 395/115 |

FOREIGN PATENT DOCUMENTS

JP         407223341 A  *  8/1995

* cited by examiner

Primary Examiner—Thomas Lee
Assistant Examiner—Chun Cao
(74) Attorney, Agent, or Firm—Fitzpatrick, Cella, Harper & Scinto

(57) ABSTRACT

Disclosed is an image output system. The image output system comprises input unit for inputting image data, a memory for storing image data input by the input unit, output means for outputting image data stored in the memory, entry means for entering an output condition under which the output means outputs the image data, and an instruction to begin to output the image data, and control unit for controlling an output operation such that the image data is to be output by the output means upon entry of the output condition and the instruction at the entry unit.

19 Claims, 11 Drawing Sheets

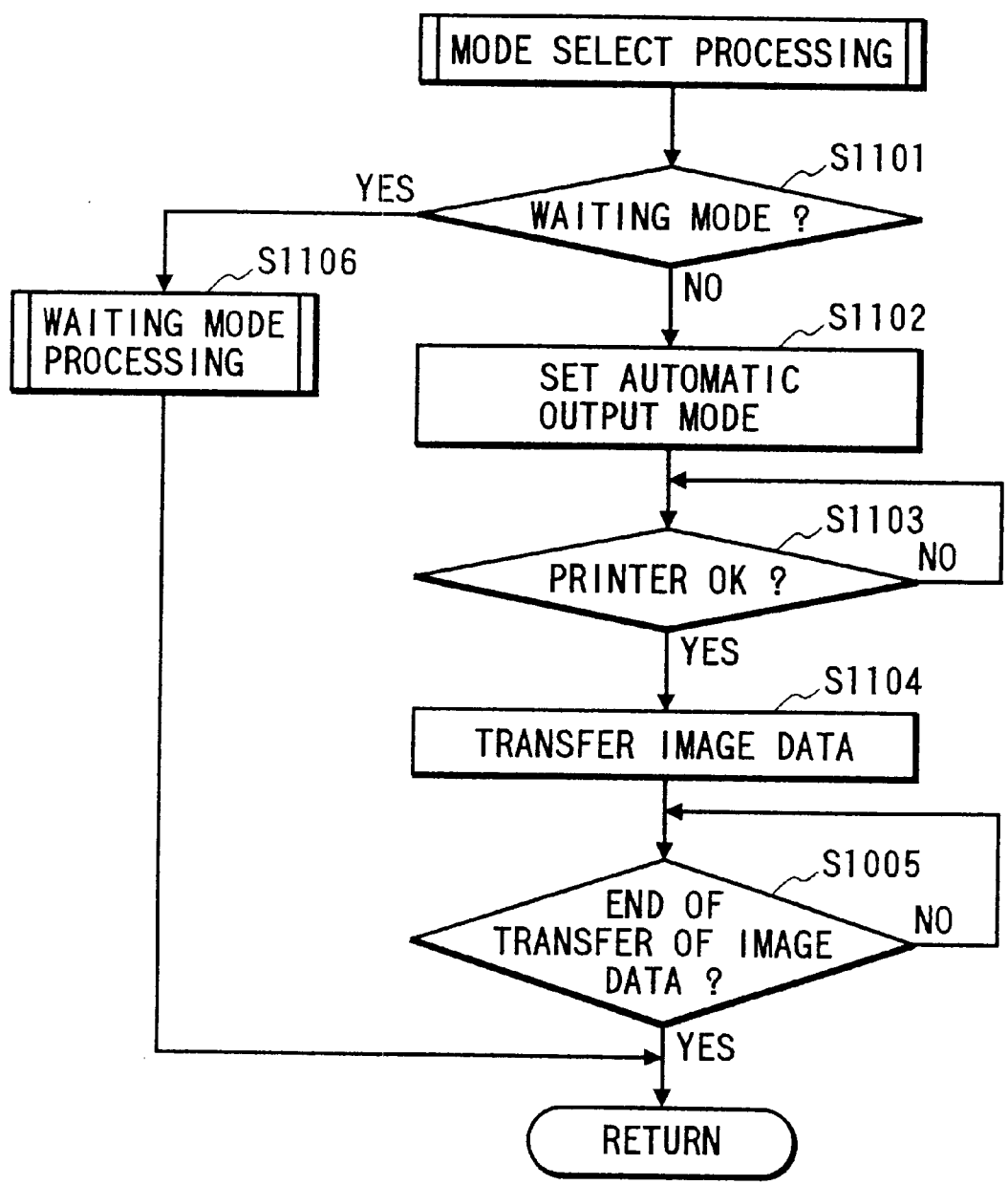

IMAGE OUTPUT METHOD AND SYSTEM WITH A FUNCTION TO CHANGE A RECEIVED PRINT CONDITION

This application is a division of application Ser. No. 09/020,234, filed on Feb. 6, 1998, now U.S. Pat. No. 6,173,338.

BACKGROUND OF THE INVENTION

1. Field of the Invention

The present invention relates to an image output system and an image output method for visually providing image data that are transmitted, for example, by a computer terminal.

2. Related Background Art

Recently, a system has been proposed wherein a host computer for editing images, an image processing apparatus for managing images, and a printer, such as a color copying machine, are connected together, and whereby PDL image data are transmitted by the host computer, via a network, to the image processing apparatus whereat they are translated, the resultant image data being transmitted thereafter to the color copying machine to be used to provide high quality images on paper, etc.

The functions of current color copying machines have been enhanced, double side copying and sorting/stapling functions, for example, now being provided for copying machines, and consequently, the procedures required of image processing apparatuses to control the printing processes performed by color copying machines have become complicated. In addition, the engine speeds of the copying machines have been increased compared with the speeds of the previous conventional color copying machines.

However, the following problems have arisen for the efficiency of the above prior art. Although the cost per sheet for color printing is high, printing failures at color copying machines occur frequently.

The translation of PDL image data and the transfer of the resultant image data to a color copying machine, tasks which are performed by an image processing apparatus, may not be performed rapidly enough to keep up with the sequential printing speed available with a color copying machine. In other words, during the printing of a plurality of sheets, the engine of a color copying machine may have to be halted temporarily to wait until data can be received from an image processing apparatus.

In this case, the color copying machine can not proceed to the execution of another process, and its work efficiency is very low.

In addition, if an operator is dissatisfied with the results of a printing run, image data must be re-transmitted by the host computer.

SUMMARY OF THE INVENTION

It is, therefore, one object of the present invention to provide an image output system and an image output method to resolve the above described problems.

It is another object of the present invention to provide an image output system and an image output method for temporarily holding received image data and for outputting them after an output condition has been designated.

It is an additional object of the present invention to provide an image output system and an image output method for developing received image data, and for beginning to output the image data after an output condition has been designated.

The above objects and other objects of the present invention will become apparent during the course of the detailed description of the preferred embodiments, given while referring to the following drawings.

BRIEF DESCRIPTION OF THE DRAWINGS

FIG. 11 is a flowchart showing the processing for the selection of an appropriate output mode for printing data.

DETAILED DESCRIPTION OF THE PREFERRED EMBODIMENTS

The preferred embodiments of the present invention will now be described while referring to the accompanying drawings. In the following embodiments, an image processing system comprising a digital color copying machine and an image processing apparatus is shown as an example application of the present invention. The present invention is not limited to such a system, however, and can be applied to various other apparatuses.

[1] First Embodiment

Figure 2:
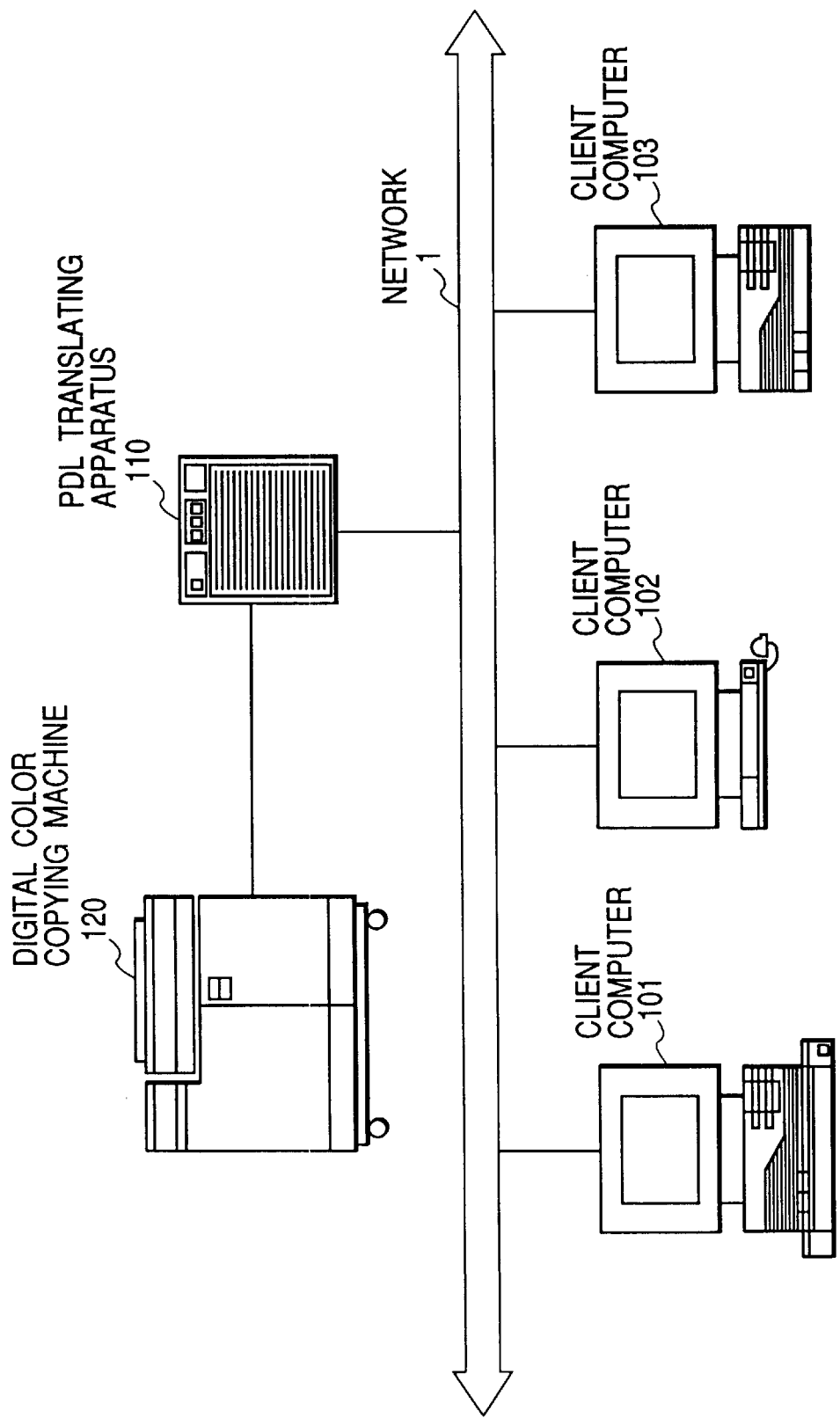
FIG. 2 is a block diagram illustrating the entire physical arrangement of the image processing system according to the first embodiment of the present invention.

The arrangement of an image processing system according to a first embodiment and the arrangements of the individual apparatuses in the system will now be described. FIG. 2 is a diagram for explaining the arrangement of the image processing system according to the first embodiment. The image processing system comprises a digital color copying machine 120, an image processing apparatus (a PDL translating apparatus) 110, and a plurality of client computers 101, 102 and 103.

The upper portion of the digital color copying machine 120 comprises a digital image reader and a digital image printer for printing a color or a gray scale digital image, and is connected to the image processing apparatus (the PDL translating apparatus) 110. The image processing apparatus (the PDL translating apparatus) 110 and the client computers 101, 102 and 103, for employment by a plurality of client users, are connected to a network 1. Only three client computers are shown in FIG. 2, but additional client computers can be connected to the network 1.

The arrangements of the individual apparatuses of the image processing system according to the first embodiment will now be described in detail in the given order: the digital color copying machine 120, the client computers 101, 102 and 103 and the image processing apparatus (the PDL translating apparatus) 110.

Figure 3:
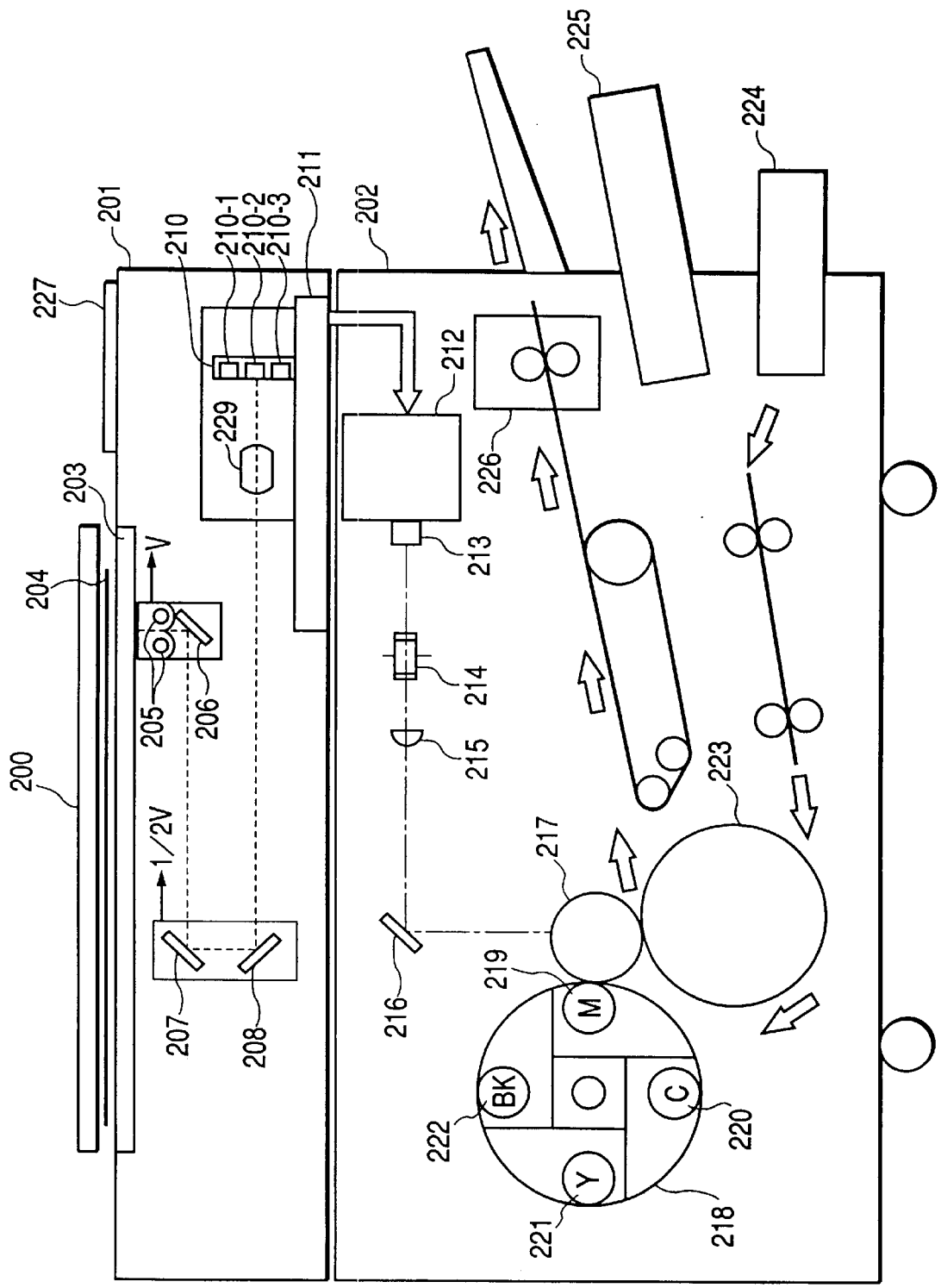
FIG. 3 is a diagram for explaining the structure of a digital color copying machine used for the image processing system according to the first embodiment of the present invention.

FIG. 3 is a diagram for explaining the structure of the digital color copying machine 120. The digital color copying machine 120 comprises: an image scanner 201 for reading a document image; a signal processor 211 for processing an image signal; a printer 202 for virtually outputting image data on recording sheets; and an operation console 227 at which an operator can input operation instructions. The individual sections are controlled by a CPU in accordance with a program stored in a built-in ROM in the digital color copying machine 120. In the digital color copying machine 120 is also included a RAM used to store various data.

The image scanner 201 includes a mirror faced pressure plate 200, a document table glass 203, a lamp 205, mirrors 206 and 207, a lens 209, and a 3-line sensor 210 (210-1, 210-2 and 210-3) for R, G and B. The printer 202 includes a laser driver 212; a semiconductor laser 213; a polygon mirror 214; an f-θ lens 215; a mirror 216; a photosensitive drum 217; a rotary developing unit 218, having a magenta developer 219, a cyan developer 220, a yellow developer 221 and a black developer 222; a transfer drum 223, paper cassettes 224 and 225; and a fixing unit 226.

The functions of the above sections will be described in detail. The image scanner 201 reads a document at a resolution of 400 dpi (dots/inch), for example, and performs a digital signal process. The printer 202 prints, on a sheet of paper at a resolution of 400 dpi, a full-color image that corresponds to the document image data read by the image scanner 201.

In the image scanner 201, a document 204 is placed between the lower face of the mirror faced pressure plate 200 and the upper face of the document table glass (the platen) 203, and is irradiated by the lamp 205. The reflected light is guided by the mirrors 206, 207 and 208, passes through the lens 209 and is focused on the 3-line sensor (CCD) 210 to form an image. The image is transmitted to the signal processor 211 as red (R), green (G) and blue (B) color elements of full color data.

A drive mechanism (not shown) mechanically drives the lamp 205 and the mirror 206 at velocity V and the mirrors 207 and 208 at velocity (½)V in a direction perpendicular to the electric scanning direction of the line sensor 210, thereby scanning the face of the document (sub-scanning).

The signal processor 211 electrically processes an image signal that is read, and separates the signal into magenta (M), cyan (C), yellow (Y) and black (Bk) elements, which are then transmitted to the printer 202. Each time the image scanner 201 scans the document, one of the M, C, Y and Bk elements is transmitted to the printer 202, so that four document scans are performed to complete the reading for the printing of one page.

The M, C, Y and Bk image signals originating at the image scanner 201 are transmitted to the laser driver 212 of the printer 202, and the laser driver 212 modulates the output of the semiconductor laser 213 in consonance with the received image signals. A laser beam emitted by the semiconductor laser 213 passes through the polygon mirror 214, the f-θ lens 215 and the mirror 216 and impinges on the photosensitive drum 217.

The rotary developing unit 218 includes the magenta developer 219, the cyan developer 220, the yellow developer 221 and the black developer 222. The four developers alternately contact the photosensitive drum 217, and use their toners to develop an electrostatic latent image formed on the photosensitive drum 217. Rolled around the transfer drum 223 is a sheet of paper, supplied from either the paper cassette 224 or 225, to which the image developed on the photosensitive drum 217 is transferred.

M, C, Y and Bk color toners are sequentially transferred to the paper in the above described manner, and are fixed to the paper as it is passed through the fixing unit 226, whereafter it is finally discharged.

Figure 4:
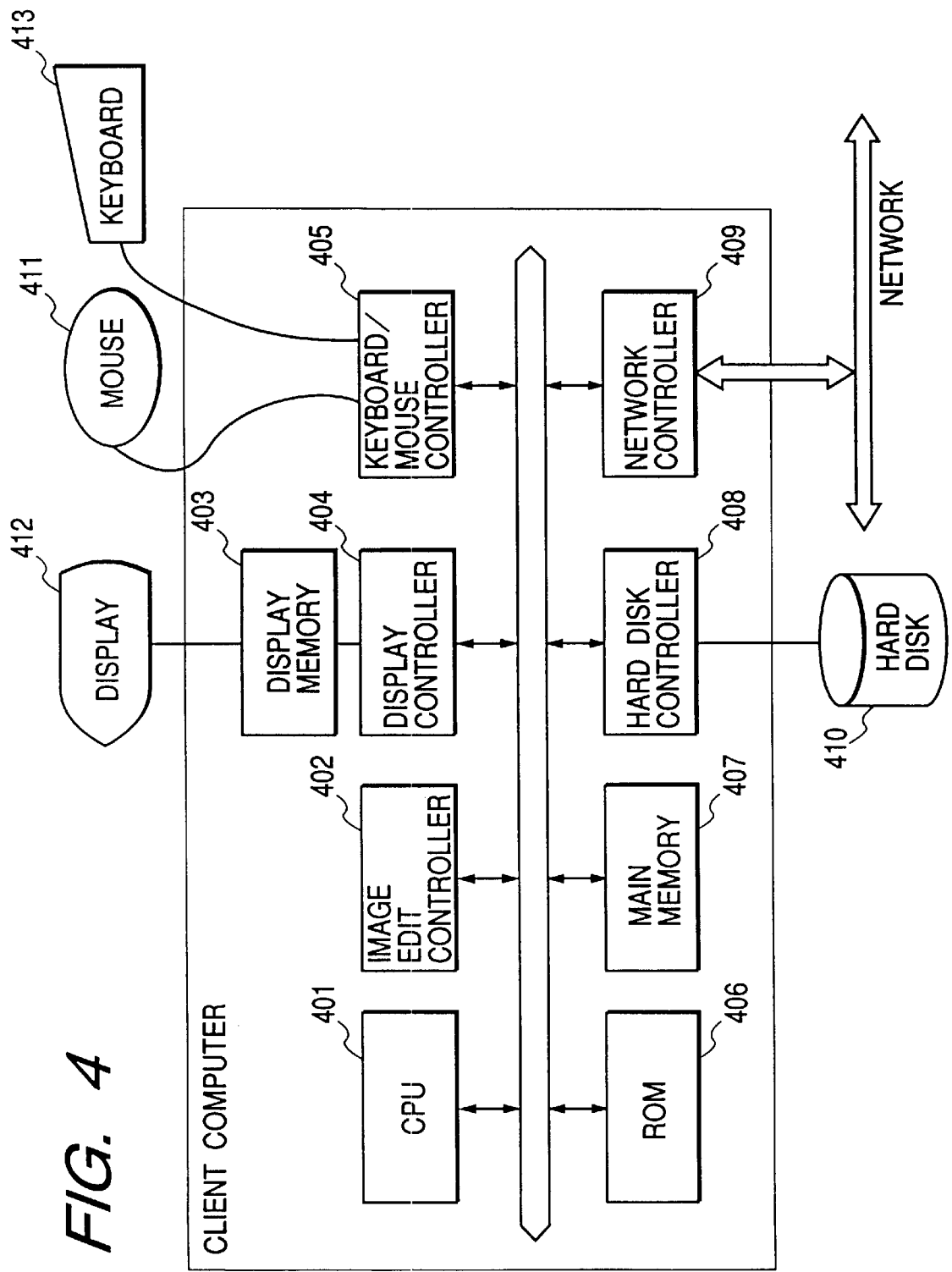
FIG. 4 is a block diagram illustrating the arrangement of a client computer in the image processing system according to the first embodiment of the present invention.

FIG. 4 is a block diagram illustrating the arrangement of one of the client computers. The client computer, a general-purpose personal computer, comprises a CPU 401, an image edit controller 402, a display memory 403, a display controller 404, a keyboard/mouse controller 405, a ROM 406, a main memory 407, a hard disk controller 408, a network controller 409, a hard disk 410, a mouse 411, a display 412, and a keyboard 413.

The functions of the above individual sections will now be described in detail. The CPU 401 serves as the central control for the client computer, employing a program stored in the ROM 406 or on the hard disk 410, which the image edit controller 402 performs image layout and editing for the display memory 403. The display memory 403 is used to store data to be output to the display 412, and the display controller 404 controls the display 412.

The keyboard/mouse controller 405 controls the mouse 411 and the keyboard 413. The ROM 406 is used to store a program to be executed by the CPU 401, and the main memory 407 is used for the storage of various data. The hard disk controller 408 controls the hard disk 410.

The network controller 409 handles communication with the image processing apparatus 110 or other components via the network. The hard disk 410 is used for the temporary storage of image data or for the storage of a variety of other data. The mouse 411 and the keyboard 413 are employed by an operator as input devices for issuing instructions to the client computer. And the display 412 is used to display the image layout and the edition menu.

Figure 1:
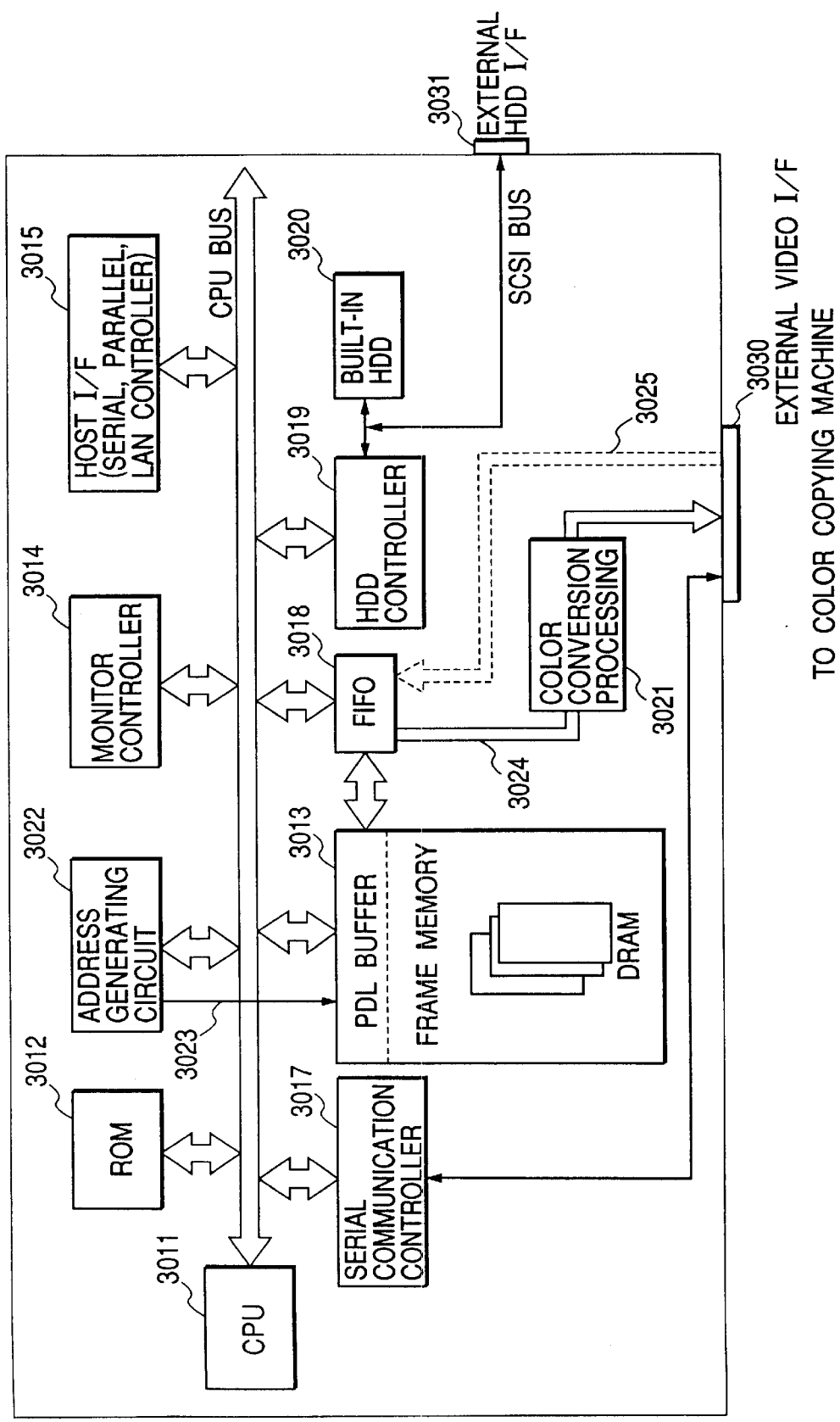
FIG. 1 is a block diagram illustrating the arrangement of an image processing apparatus in an image processing system according to a first embodiment of the present invention.

FIG. 1 is a block diagram illustrating the arrangement of the image processing apparatus 110. The image processing apparatus 110 comprises a CPU 3011, a ROM 3012, an address generation circuit 3022, a monitor controller 3014, a host interface 3015, a serial communication controller 3017, a DRAM 3013, an FIFO (First-in First-out) buffer 3018, an HDD (hard disk) controller 3019, a built-in HDD 3020, and a color conversion processor 3021.

The functions of the above sections will now be described in detail. The CPU 3011 controls the entire image processing apparatus 110 via a CPU bus in accordance with a program stored in the ROM 3012. A fast processing CPU, such as an RISC (Reduced Instruction Set Computer), for the CPU 3011 in order to perform, for example, image development using PDL (Page Description Language) data, which consists of control data and image data, in PostScript (a page description language, developed by Adobe Systems Inc., that is used for printers and is capable of describing the appearance of a page in its entirety, to include fonts, geometric patterns and image graphics). It should be noted that the CPU 3011 handles a variety of other types of image data as well as the PDL data.

The ROM 3012 is used to store a program to be executed by the CPU 3011, while the address generator 3022 generates an address 3023, which will be described later, and the monitor controller 3014 is used for monitoring queued jobs in order to support a spooling function (a function for activating a low-speed input/output device in parallel with the CPU to increase the processing efficiency of the entire computer).

The serial communication controller 3017 provides serial communication with the digital color copying machine 120 (see FIGS. 2 and 3) via an external video interface 3030. The DRAM 3013 includes a partial region (PDL buffer) and a specified region (frame memory) in which are respectively stored PDL data and a write address, which will be described later. The FIFO buffer 3018 is used to store data 3025 that are transmitted by the digital color copying machine 120 via the external video interface 3030.

The color conversion processor 3021 performs the color conversion of data 3024 that are output by the FIFO 3018. The HDD controller 3019 controls the built-in HDD 3020, which is used to store font data. The HDD controller 3019 and the built-in HDD 3020, and an external video interface 3031 are connected by a SCSI (Small Computer System Interface: a standard interface for connecting peripheral devices to a small computer) bus.

The host interface 3015 is a controller for a serial interface, a parallel interface and a LAN (Local Area Network) interface, and receives PDL data from a host computer. Image data from the host computer are transmitted via either the serial interface, the parallel interface or the LAN interface, while a cable can be connected at the same time.

The thus received PDL data (including PDL data temporarily stored in the HDD, etc., of the image processing apparatus 110) are stored via the CPU bus in the partial region (a PDL buffer) in the DRAM 3013. Font data stored in an external HDD are employed and the PDL stored in the partial region of the DRAM 3013 are developed to obtain raster image data (red, green and blue). Then, a write address 3023 for each frame memory is generated by the address generation circuit 3022 and is stored in the specified region (frame memory) in the DRAM 3013.

The digital color copying machine 120 (see FIGS. 2 and 3) in this embodiment is a color electrophotographic copying machine that forms images for a plurality of output color elements, cyan, magenta, yellow and black. In consonance with a sync signal (not shown) from the digital color copying machine 120, synchronous image data are temporarily stored in the FIFO buffer 3018.

The data 3024 are transmitted from the FIFO buffer 3018 to the color conversion processor 3021 to perform color conversion. That is, the red, green and blue raster image data are converted into raster image data (cyan, magenta, yellow and black) to be printed by the digital color copying machine 120. Then, the raster image data are transmitted to the external video interface 3030, and based on the signal, the image forming unit of the digital color copying machine 120 forms images.

Figure 5:
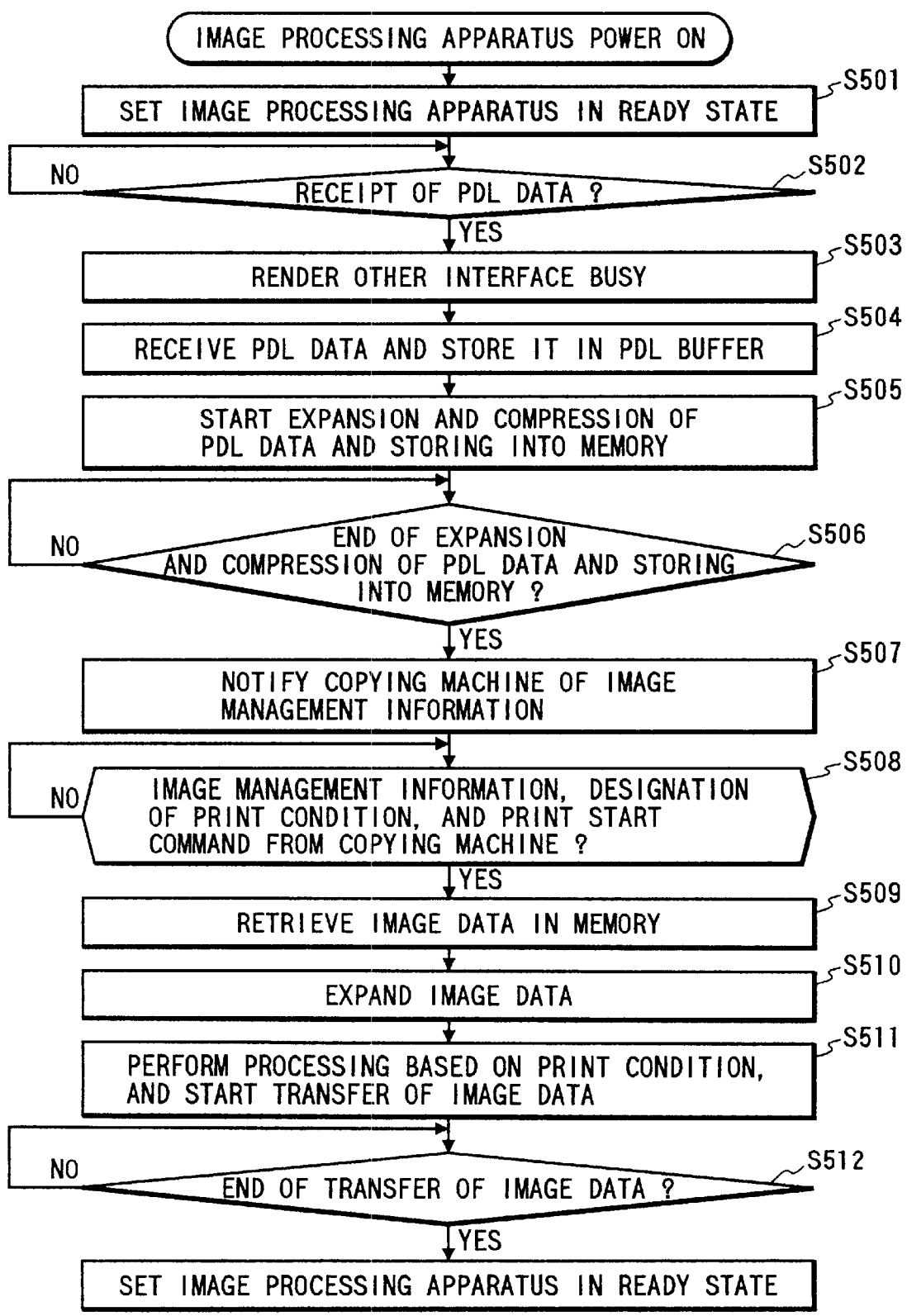
FIG. 5 is a flowchart showing the control process performed by the image processing apparatus in the image processing system according to the first embodiment of resent invention.

The control exercised by the image processing apparatus 110 in the image processing system according to the first embodiment will now be described while referring to the flowchart in FIG. 5.

First, when the image processing apparatus 110 is powered on, it is set to the ready state (step S501). The image processing apparatus 110 determines whether PDL data are to be acquired from the host computer, and waits until PDL data are received (step S502). When the PDL data are transmitted by the host computer, other interfaces are set to the busy state to inhibit the receipt of data at the other interfaces (step S503).

Following this, the image processing apparatus 110 begins the reception process for the PDL data, and temporarily stores such data in the PDL buffer in the DRAM 3013 (step S504). The received PDL data are developed to obtain raster image data, which thereafter are compressed and stored in the image memory (step S505). Then, a check is performed to determine whether the development of the PDL data to obtain raster image data and the compression and the storage of the raster data in the image memory have been completed (step S506). It should be noted that the data are so compressed that they can be decompressed at high speed.

The above described image memory may be either the DRAM 3013 (see FIG. 1) that has a fast access time, or the built-in HDD 3020 (see FIG. 1) that has a low price and a large memory capacity, even though it has a slower access time than does the DRAM 3013. The selection of the image memory depends on the performance of the entire system, and the memory capacity of the DRAM or the disk that is mounted.

In this embodiment, the raster image data obtained by developing the received PDL data, and the image data obtained by decompressing the compressed raster image data, are stored in the DRAM 3013, while the compressed raster image data are stored in the built-in HDD 3020.

When, at step S506, the development of the PDL data to obtain the raster image data, and compression and the storage of the raster image data are terminated, the image processing apparatus 110 transmits to the digital color copying machine 120 image management information to be used to identify the image data stored in the image memory, and the transmission source for the image data (step S507).

The image management information can be any information employed for identifying and managing an image that is prepared by the host computer, e.g., a file name for storing the image in a storage device, such as an HDD, or numerals for managing the image.

Next, the image processing apparatus 110 determines whether it has received from the digital color copying machine 120 image management information, a designated print condition and a print start command (step S508). Upon the receipt of the entry from a user, the image processing apparatus 110 searches the HDD 3020 for image data to be printed (step S509). Since at steps S505 and S506 the image data were compressed and stored in the image memory, the compressed data are decompressed to obtain non-compressed data available for printing (step S510).

Following this, in accordance with the print condition designated by the digital color copying machine 120, the image processing apparatus 110 changes the page order and the direction of the image, and transfers the image data to the digital color copying machine 120 (step S511).

The print condition is relative to the performance of the digital color copying machine 120 being used as a printer: a condition whereby, when printed paper sheets stacked on the discharge tray are to be stapled only from the top down, the printing order for pages is changed for the printing of one side or of both sides of the paper sheets, and the image data are output in that order to the digital color copying machine, with the first page of the image data being the topmost page of a stack on the paper discharge tray; or a condition whereby, for example, for double-side image printing, while taking the positions of staples (stapling at one position or at two positions) into account, the image is rotated 180°, depending on whether the direction of the image on the obverse face corresponds to or is opposite to that on the reverse face, and the image data are then output to the digital color copying machine 120.

The image processing apparatus 110 determines whether the transfer of the image data to the digital color copying machine 120 has, been completed (step S512). When the transfer of the image data has been terminated, the image processing apparatus 110 is shifted to the ready state (step S501) to wait for the receipt of PDL data.

The control performed by the digital color copying machine 120 in the image processing system according to the first embodiment will now be described while referring to the flowchart in FIG. 6.

First, when the digital color copying machine 120 is powered on, it is set to the ready state (step S601). The digital color copying machine 120 then determines whether or not it has received a notice of image management information from the image processing apparatus 110 (step S602). If a notice of image management information has been received, it is assumed that the image data to be printed is stored in the image memory in the image processing apparatus 110.

Next, the digital color copying machine 120 determines whether a user has entered an instruction to display image management information through the operation console 227 (step S603). When the display instruction has been entered, all the image management information transmitted by the image processing apparatus 110 is listed on the display portion of the operation console 227. In addition, all the print conditions available for the digital color copying machine 120 are also shown (step S604).

For example, double-side printing, or stapling (the direction of the staples=whether printed sheets of paper on the discharge tray should be stapled from the top down or from the bottom up, and at how many locations the prints should be stapled), and/or sort printing is shown as the print condition.

The digital color copying machine 120 determines whether a user has entered the image management information, designated the print condition and entered a print start command at the operation console 227 (step S605). If the entry has been made by the user, the image processing apparatus 110 notifies the image processing apparatus 110 of the image management information to be printed and the print conditions, and issues a print start command (step S606).

The digital color copying machine 120 determines whether the print start request has been received from the image processing apparatus 110, and if not, waits until it receives a print start request (step S607). Upon the receipt of the print start request from the image processing apparatus 110, the digital color copying machine 120 sets the display on the operation console 227 to a remote print state for the printing of data transmitted by the host computer, and inhibits key input for other processes (step S608). Then, the remote printing is begun (step S609). Subsequently, a check is performed to determine whether or not the remote control printing has been completed (step S610). When the remote control printing has been completed, the digital color copying machine 120 shifts to the ready state (step S601).

When, at step S602, no notice of the image management information is transmitted by the image processing apparatus 110, the digital color copying machine 120 ascertains that image data to be printed are not stored in the image memory in the image processing apparatus 110. A check is then performed to determine whether or not there is a local copy request for directly printing a document image that was read by the image scanner 201 (step S611). If there is no local copy request, the digital color copying machine 120 shifts to the ready state (step S601).

If there is a local copy request, the digital color copying machine 120 sets the display on the operation console 227 to a local copy state, and inhibits key input for other processes (step S612). Then, local copying is begun (step S613), during which checks are performed to determine whether or not the local copying has been completed (step S614). When the local copy is found to have been terminated, the digital color copying machine 120 shifts to the ready state (step S601).

When at step S603 no notice of image management information has been received, or when at step S605 no print start command has been entered at the operation console 227, the digital color copying machine 120 executes the processing beginning at step S611.

The input of image data by the digital color copying machine 120 will now be described. The image data, which are read by the image scanner 201 of the digital color copying machine 120, are transmitted as red, green and blue multi-value dot data to the image processing apparatus 110. The image data are temporarily stored in the FIFO buffer 3018 (see FIG. 1), so that image data can be read synchronously in consonance with a sync signal received from the image processing apparatus 110.

In consonance with the sync signal, the image data are stored in the frame memory 3013 (see FIG. 1) in the image processing apparatus 110. Then, the address generating circuit 3022 (see FIG. 1) generates an address 3023 to thin out the image data that are stored in the frame memory 3013, and the resultant data are transmitted via the parallel interface to the host computer.

As is described above, according to the first embodiment, the image processing apparatus (PDL translating apparatus) 110 comprises: the CPU 3011, for developing image data input by a computer to obtain a raster image, for compressing and storing the raster image on the HDD 3020, and for searching the HDD 3020 for the image data based on the image management information received from the digital color copying machine 120; the HDD 3020, for storing image data; the color conversion processor 3021, for performing color conversion of the image data in accordance with an image forming/output instruction from the digital color copying machine 120; and the external video interface 3030, for outputting the image management information and the image data to the digital color copying machine 120. Therefore, the image processing apparatus 110 can rapidly perform image data processing and transfer of image data to the digital color copying machine 120, so that the performance of the digital color copying machine 120 can be fully demonstrated, and the number of failures occurring during in the double-sided printing and sorting/stapling printing can be reduced.

Further, the printing can be performed at a timing consonant with the engine speed of the digital color copying machine 120. That is, the down-time spent for temporarily halting the engine during the printing and waiting for image data to be received from the image processing apparatus 110 can be reduced and the performance when printing a plurality of sheets and a plurality of copies can be improved.

A reliable system experiencing few failures can be provided for electronically distributed data, and book binding, as desired by a user, can be easily implemented.

[2] Second Embodiment

The entire arrangement of an image processing system according to a second embodiment, and the arrangements of a digital color copying machine, an image processing apparatus and a client computer in the image processing system are the same as those in the first embodiment (see FIGS. 1 to 4). Since their arrangements have been described in detail in the first embodiment, no explanation for them will be given here.

In the second embodiment, the available print conditions are programmed in advance, and are stored as print modes in the internal RAM of a digital color copying machine 120, the print mode being selectable at an operation console 227 on the digital color copying machine 120. As a result, no labor is required for the designation of a number of print conditions one by one on the operation console 227 of the digital color copying machine 120 and the usability is thereby enhanced.

Figure 7:
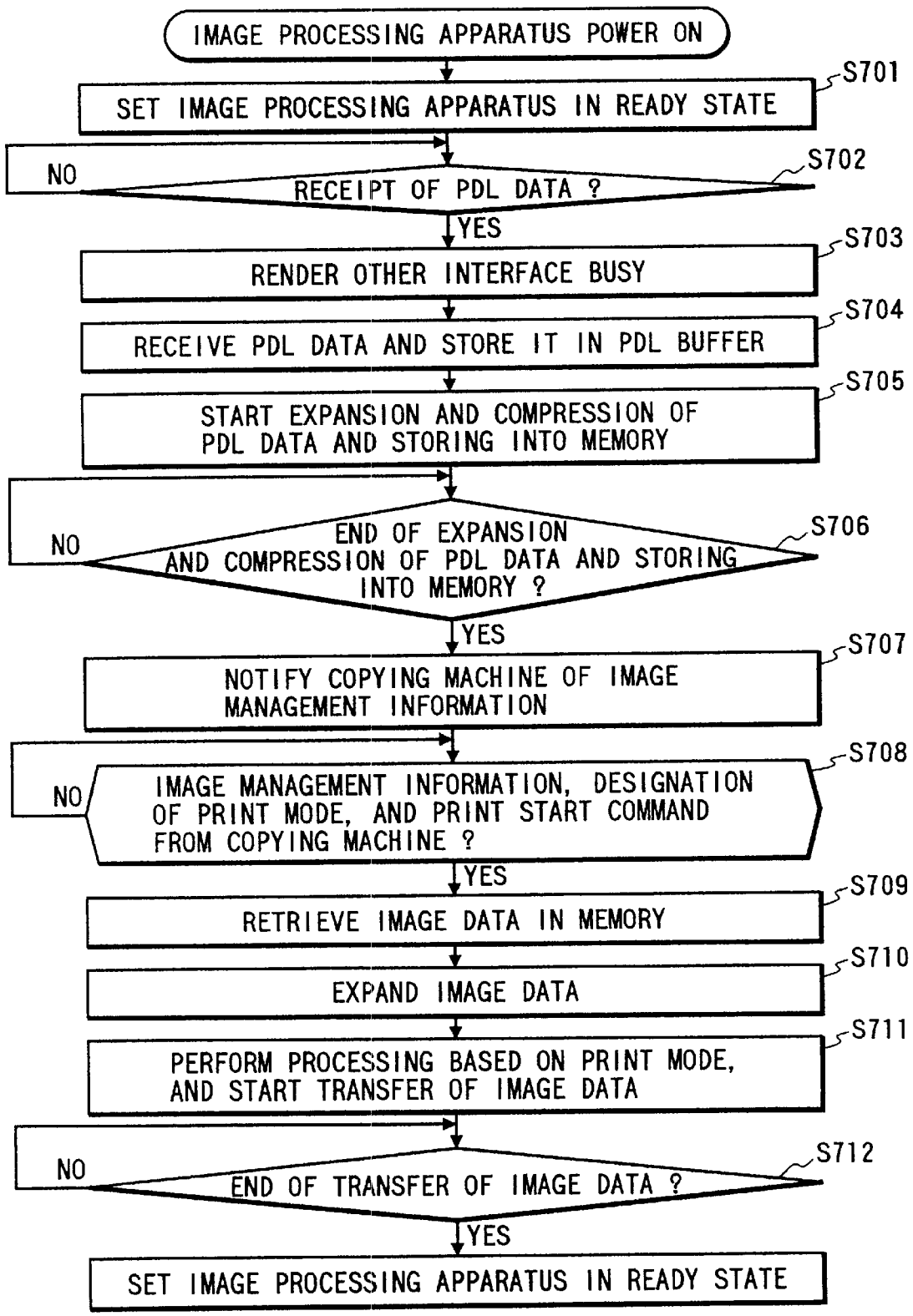
FIG. 7 is a flowchart showing the control process performed by an image processing apparatus in an image processing system according to a second embodiment of the present invention.

The control performed by an image processing apparatus 110 in the image processing system according to the second embodiment will now be described while referring to the flowchart in FIG. 7.

First, when an image processing apparatus 110 is powered on, it is set to the ready state (step S701). The image processing apparatus 110 determines whether PDL data are to be acquired from a host computer, and waits until PDL data are received (step S702). When the PDL data are transmitted by the host computer, other interfaces are set to the busy state to inhibit the receipt of data at the other interfaces (step S703).

Following this, the image processing apparatus 110 begins the reception process for the PDL data, and temporarily stores such data in the PDL buffer in a DRAM 3013 (step S704). The received PDL data are developed to obtain raster image data, which thereafter are compressed and stored in the image memory (step S705). Then, a check is performed to determine whether the development of the PDL data to obtain raster image data and the compression and the storage of the raster data in the image memory have been completed (step S706).

The above described image memory may be either the DRAM 3013 (see FIG. 1) that has a fast access time, or the built-in HDD 3020 (see FIG. 1) that has a low price and a large memory capacity, even though it has a slower access time than does the DRAM 3013. The selection of the image memory depends on the performance of the entire system, and the memory capacity of the DRAM or the disk that is mounted.

In this embodiment, the raster image data obtained by developing the received PDL data, and the image data obtained by decompressing the compressed raster image data, are stored in the DRAM 3013, while the compressed raster image data are stored in the built-in HDD 3020.

When, at step S706, the development of the PDL data to obtain the raster image data, and compression and the storage of the raster image data are terminated, the image processing apparatus 110 transmits to a digital color copying machine 120 image management information to be used to identify the image data stored in the image memory, and the transmission source for the image data (step S707).

The image management information can be any information employed for identifying and managing an image that is prepared by the host computer, e.g., a file name for storing the image in a storage device, such as an HDD, or numerals for managing the image.

Next, the image processing apparatus 110 determines whether it has received from the digital color copying machine 120 image management information, a designated print condition and a print start command (step S708). Upon the receipt of the entry from a user, the image processing apparatus 110 searches the HDD 3020 for image data to be printed (step S709). Since at steps S705 and S706 the image data were compressed and stored in the image memory, the compressed data are decompressed to obtain non-compressed data available for printing (step S710).

Following this, in accordance with the print mode designated by the digital color copying machine 120, the image processing apparatus 110 changes the page order and the direction of the image, and transfers the image data to the digital color copying machine 120 (step S711).

The print mode is a combination of several print conditions, such as a double-side and sorting mode, a double-side and stapling (two staplings) mode, or a one-side and sorting/stapling (one stapling) mode. A user need only select a desired print mode at the operation console. Therefore, since the user does not have to choose one by one from a number of print conditions, but simply selects a mode, the usability is improved.

The image processing apparatus 110 determines whether the transfer of the image data to the digital color copying machine 120 has been completed (step S712). When the transfer of the image data has been terminated, the image processing apparatus 110 is shifted to the ready state (step S701) to wait for the receipt of PDL data.

The control performed by the digital color copying machine 120 in the image processing system according to the second embodiment will now be described while referring to the flowchart in FIG. 8.

First, when the digital color copying machine 120 is powered on, it is set to the ready state (step S801). The digital color copying machine 120 then determines whether or not it has received a notice of image management information from the image processing apparatus 110 (step S802). If a notice of image management information has been received, it is assumed that the image data to be printed is stored in the image memory in the image processing apparatus 110.

Next, the digital color copying machine 120 determines whether a user has entered an instruction to display image management information through the operation console 227 (step S803). When the display instruction has been entered, all the image management information transmitted by the image processing apparatus 110 is listed on the display portion of the operation console 227. In addition, all the print modes available for the digital color copying machine 120 are also shown (step S804).

For example, the double-side and sorting mode, the double-side and stapling (two staplings) mode, or the one-side and sorting/stapling mode, is displayed. Further, a mode that the user designates frequently can be programmed in advance, and a double-side mode involving bookbinding for the double-side printing of pages 1, 2, N–1 and N of a document having N pages can be programmed.

The digital color copying machine 120 determines whether a user has entered the image management information, designated the print condition and entered a print start command at the operation console 227 (step S805). If the entry has been made by the user, the image processing apparatus 110 notifies the image processing apparatus 110 of the image management information to be printed and the print conditions, and issues a print start command (step S806).

The digital color copying machine 120 determines whether the print start request has been received from the image processing apparatus 110, and if not, waits until it receives a print start request (step S807). Upon the receipt of the print start request from the image processing apparatus 110, the digital color copying machine 120 sets the display on the operation console 227 to a remote print state for the printing of data transmitted by the host computer, and inhibits key input for other processes (step S808). Then, the remote printing is begun (step S809). Subsequently, a check is performed to determine whether or not the remote control printing has been completed (step S810). When the remote control printing has been completed, the digital color copying machine 120 shifts to the ready state (step S801).

When, at step S802, no notice of the image management information is transmitted by the image processing apparatus 110, the digital color copying machine 120 ascertains that image data to be printed are not stored in the image memory in the image processing apparatus 110. A check is then performed to determine whether or not there is a local copy request for directly printing a document image that was read by the image scanner 201 (step S811). If there is no local copy request, the digital color copying machine 120 shifts to the ready state (step S801).

If there is a local copy request, the digital color copying machine 120 sets the display on the operation console 227 to a local copy state, and inhibits key input for other processes (step S812). Then, local copying is begun (step S813), during which checks are performed to determine whether or not the local copying has been completed (step S814). When the local copy is found to have been terminated, the digital color copying machine 120 shifts to the ready state (step S801).

When at step S803 no notice of image management information has been received, or when at step S805 no print start command has been entered at the operation console 227, the digital color copying machine 120 executes the processing beginning at step S811.

As is described above, according to the second embodiment, the image processing apparatus (PDL translating apparatus) 110 comprises: the CPU 3011, for developing image data input by a computer to obtain a raster image, and then compressing and storing the Iraster image on the HDD 3020, and for searching the HDD 3020 for the image data based on the image management information received from the digital color copying machine 120; the HDD 3020, for storing image data; the color conversion processor 3021, for performing color conversion of the image data in accordance with an image forming/output instruction from the digital color copying machine 120; and the external video interface 3030, for outputting the image management information and the image data to the digital color copying machine 120. Therefore, the image processing apparatus 110 can rapidly perform image data processing and transfer of image data to the digital color copying machine 120, so that the performance of the digital color copying machine 120 can be fully demonstrated, and the number of failures occurring during in the double-sided printing and sorting/stapling printing can be reduced.

Further, the printing can be preformed at a timing consonant with the engine speed of the digital color copying machine 120. That is, the down-time spent for temporarily halting the engine during the printing and waiting for image data to be received from the image processing apparatus 110 can be reduced, and the performance when printing a plurality of sheets and a plurality of copies can be improved.

A reliable system experiencing few failures can be provided for electronically distributed data, and book binding, as desired by a user, can be easily implemented.

Since the available print conditions can be programmed in advance as a print mode, which can be selected at the operation console 227 of the digital color copying machine 120, the labor involved in the one-by-one designation of a number of print conditions at the operation console 227 is eliminated, and the usability is improved.

[3] Third Embodiment

The entire arrangement of an image processing system according to a third embodiment, and the arrangements of a digital color copying machine, an image processing apparatus and a client computer in the image processing system are the same as those in the first embodiment (see FIGS. 1 to 4). Since their arrangements have been described in detail in the first embodiment, no explanation for them will be given here.

As the feature of the third embodiment, an operation console is provided for an image processing apparatus 110, and print conditions or a print mode can be designated using the operation console.

Figure 9:
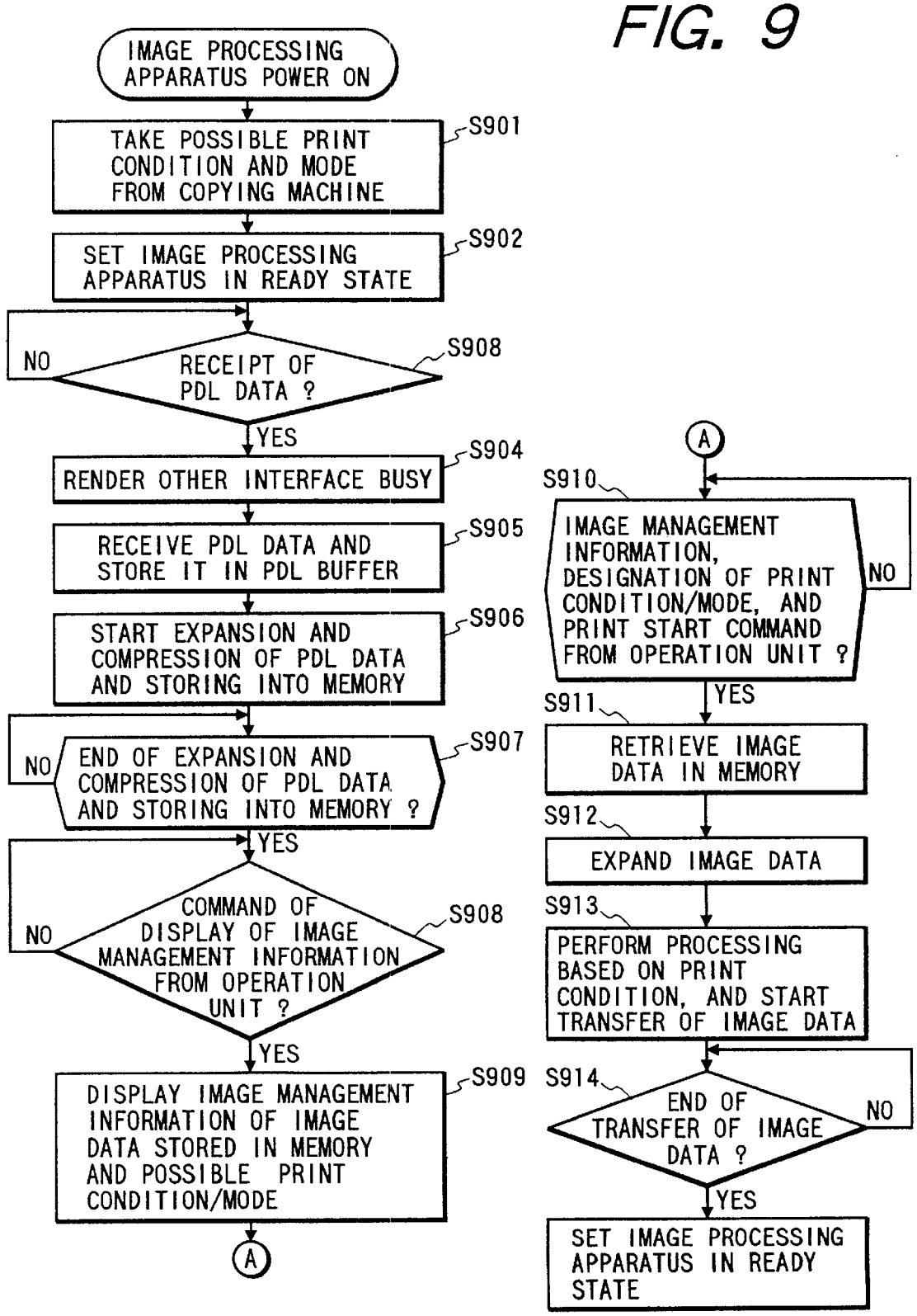
FIG. 9 is a flowchart showing the control process performed by an image processing apparatus in an image processing system according to a third embodiment of the present invention.

The control performed by the image processing apparatus 110 in the image processing system according to the third embodiment will now be described while referring to the flowchart in FIG. 9.

First, when the image processing apparatus 110 is powered on, it acquires available print conditions and/or modes from a digital color copying machine 120 (step S901), and is set to the ready state (step S902). The image processing apparatus 110 determines whether PDL data are to be acquired from a host computer, and waits until PDL data are received (step S903). When the PDL data are transmitted by the host computer, other interfaces are set to the busy state to inhibit the receipt of data at the other interfaces (step S904).

Following this, the image processing apparatus 110 begins the reception process for the PDL data, and temporarily stores such data in the PDL buffer in a DRAM 3013 (step S905). The received PDL data are developed to obtain raster image data, which thereafter are compressed and stored in the image memory (step S906). Then, a check is performed to determine whether the development of the PDL data to obtain raster image data and the compression and the storage of the raster data in the image memory have been completed (step S907).

The above described image memory may be either the DRAM 3013 (see FIG. 1) that has a fast access time, or the built-in HDD 3020 (see FIG. 1) that has a low price and a large memory capacity, even though it has a slower access time than does the DRAM 3013. The selection of the image memory depends on the performance of the entire system, and the memory capacity of the DRAM or the disk that is mounted.

In this embodiment, the raster image data obtained by developing the received PDL data, and the image data obtained by decompressing the compressed raster image data, are stored in the DRAM 3013, while the compressed raster image data are stored in the built-in HDD 3020.

When, at step S907, the development of the PDL data to obtain the raster image data, and the compression and the storage of the raster image data are terminated, the image processing apparatus 110 determines whether or not a user has issued an instruction using the operation console 227 to display image management information corresponding to the image data stored in the image memory (step S908). If such an instruction has been issued, all the image management information and the print conditions and/or modes available for the digital color copying machine 120 are displayed (step S909).

Next, the image processing apparatus 110 waits for the entry of image management information, the selection of print conditions and/or modes, and the entry of a print start command at the operation console 227 (step S910). If such entries are made, the image processing apparatus 110 searches for image data to be printed based on the image management information (step S911). Since at steps S906 and S907 the image data were compressed and stored in the image memory, the compressed data are decompressed to obtain non-compressed data available for printing (step S912).

Following this, in accordance with the print mode designated by the digital color copying machine 120, the image processing apparatus 110 changes the page order and the direction of the image, and transfers the image data to the digital color copying machine 120 (step S913). The image processing apparatus 110 determines whether the transfer of the image data to the digital color copying machine 120 has been completed (step S914). When the transfer of the image data has been terminated, the image processing apparatus 110 is shifted to the ready state (step S902) to wait for the receipt of PDL data.

As is described above, according to the third embodiment, the image processing apparatus (PDL translating apparatus) 110 comprises: the CPU 3011, for developing image data input by a computer to obtain a raster image, for compressing and storing the raster image on the HDD 3020, and for searching the HDD 3020 for the image data based on the image management information received from the digital color copying machine 120; the HDD 3020, for storing image data; the color conversion processor 3021, for performing color conversion of the image data in accordance with an image forming/output instruction from the digital color copying machine 120; and the external video interface 3030, for outputting the image management information and the image data to the digital color copying machine 120. Therefore, the image processing apparatus 110 can rapidly perform image data processing and transfer of image data to the digital color copying machine 120, so that the performance of the digital color copying machine 120 can be fully demonstrated, and the number of failures occurring during in the double-sided printing and sorting/stapling printing can be reduced.

Further, the printing can be preformed at a timing consonant with the engine speed of the digital color copying machine 120. That is, the down-time spent for temporarily halting the engine during the printing and waiting for image data to be received from the image processing apparatus 110 can be reduced, and the performance when printing a plurality of sheets and a plurality of copies can be improved.

A reliable system experiencing few failures can be provided for electronically distributed data, and book binding, as desired by a user, can be easily implemented.

In addition, since the operation console 227 is provided for the image processing apparatus 110 and print conditions or a print mode can be designated using the operation console 227, usability is improved.

In addition to the processing performed in the first to the third embodiments, in which the data received from the host computer 9 are temporarily held by the image processing apparatus 110 and are printed in consonance with a print condition and a print start instruction entered by the operator, the following processing can be performed to enhance usability.

For example, when the style of the printed result is not the one desired, re-printing can be performed under a different print condition.

This processing will now be explained.

Figure 10:
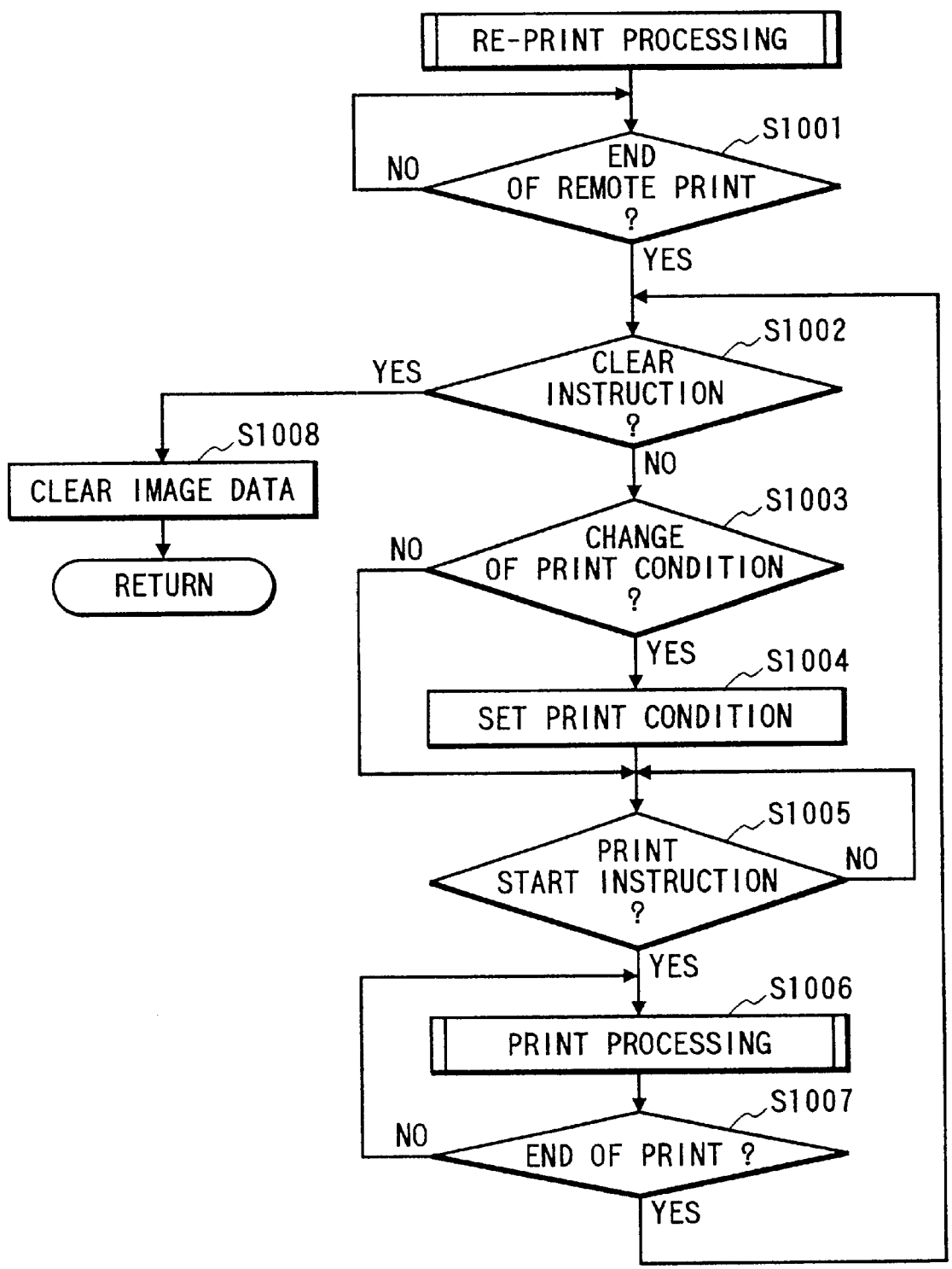
FIG. 10 is a flowchart showing the processing for the printing, under a different print condition, of image data that are accumulated in the image processing apparatus.

FIG. 10 is a flowchart showing the processing performed by the digital color copying machine 120.

Figure 6:
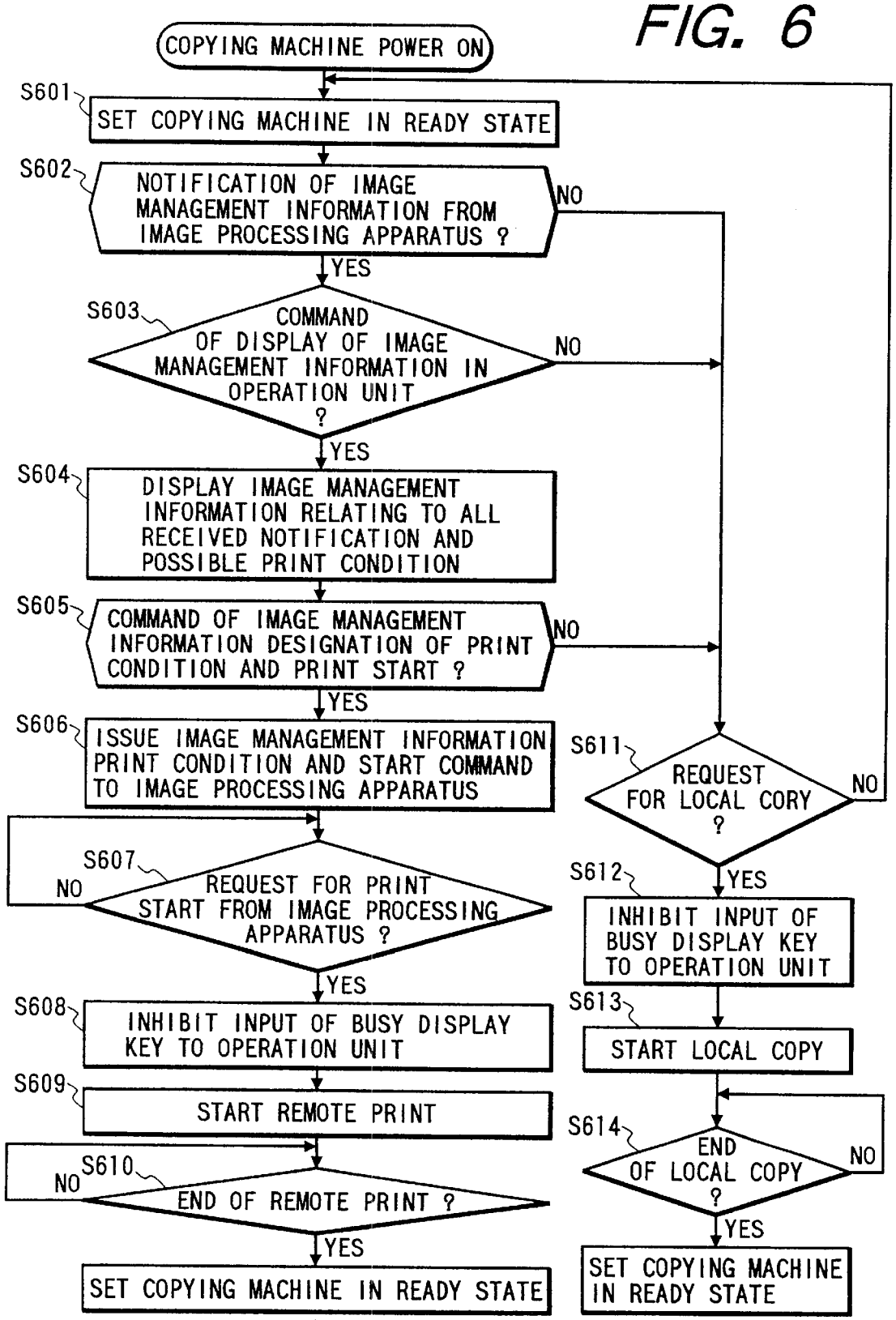
FIG. 6 is a flowchart showing the control process performed by the digital color copying machine in the image processing system according to the first embodiment of he present invention.
Figure 8:
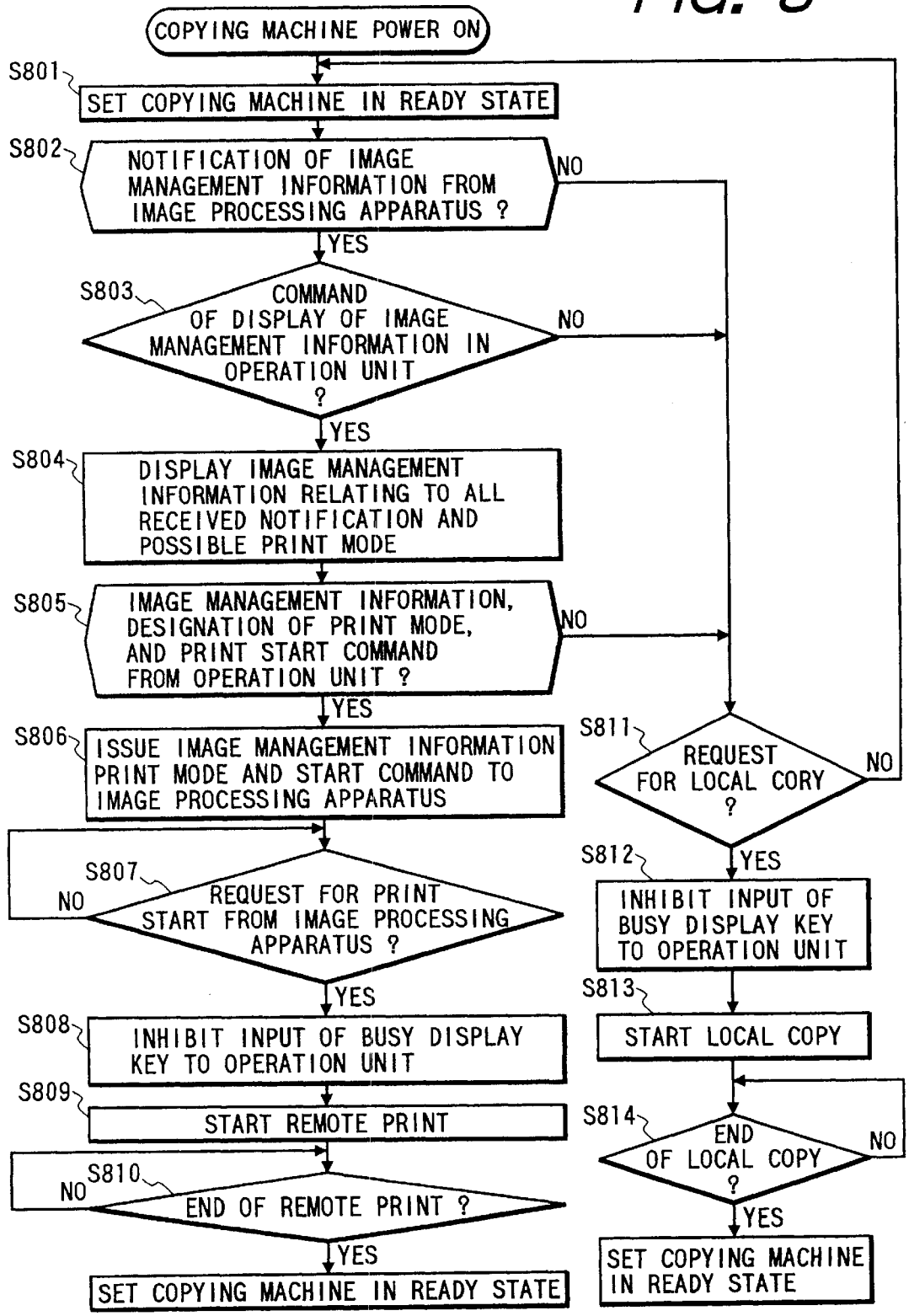
FIG. 8 is a flowchart showing the control process performed by a digital color copying machine in the image processing system according to the second embodiment of the present invention.

First, at step S1001, as well as at step S610 in FIG. 6 and at step S810 in FIG. 8, a check is performed to determine whether remote printing has been terminated.

Then, at step S1002 a check is performed to determine whether an instruction has been entered at the operation console 227 that specifies the deletion, in consonance with image management information, of the accumulated image data that are stored in the image processing apparatus 110. When deletion is not instructed, program control advances to step S1003, whereat a check is performed to determine whether an instruction has been entered at the operation console 227 to change the print condition. If the alteration of the print condition has been instructed, at step S1004 a new print condition is designated. When, at step S1005, a printing start is instructed, at step S1006, in accordance with the designated print condition, pertinent image data are received from the image processing apparatus 100 and are printed. When, at step S1007, it is ascertained that the printing has been completed, the above process is repeated until the deletion of image data is instructed.

Upon the receipt of an instruction entered at the operation console 227 to delete image data, at step S1008 the image processing apparatus 110 deletes the image data.

Through the processing shown in FIG. 10, the image data accumulated in the image processing apparatus 110 can be repeatedly printed under various print conditions.

In the above explanation, the image data from the host computer are stored in the image processing apparatus 110, and are then printed upon the receipt of a print start instruction from an operator. However, as in normal printing, image data transmitted by the host computer can be printed by changing the print condition to that designated by the host computer, as needed and without operator entry being required.

FIG. 11 is a flowchart showing the processing performed by the image processing apparatus 110 in this case.

A mode in which image data are temporarily stored and are then printed in response to a print instruction issued by an operator is called a waiting mode, and a mode in which image data are printed without operator entry being required is called an automatic output mode.

First, at step S1101 a check is performed to determine whether or not the waiting mode has been designated. The mode may be designated by the host computer, or it may be set in advance by the image processing apparatus 110 or the digital color copying machine 120.

When the waiting mode is not designated, at step S1102 the automatic output mode is set. If, at step S1103, it is ascertained that the digital color copying machine 120 is ready for printing, program control advances to step S1104, whereat image data to be printed are transferred to the digital color copying machine 120 and printed. When, at step S1105, it is ascertained that the transfer of image data has been completed, the image processing apparatus 110 is shifted to the ready state. It should be noted that the image data are stored on the HDD 3020 until a deletion instruction is received.

When the waiting mode has been designated, at step S1106 the printing is begun as previously described.

Through the processing in FIG. 11, therefore, image data can be output using a desired method.

In the above description, the image data are transmitted by the host computer, but image data may also be transmitted, for example, by a scanner that reads a document image.

The flowcharts in FIGS. 5 to 11 show the operations performed by the CPUs of the individual apparatuses based on program data loaded into the memories of these apparatuses. Appropriate hardware circuits can take the place of the program data for the performance of these operations.

The present invention can be applied to a system constituted by a plurality of devices or to an apparatus that includes only one device. The present invention can also be implemented by providing for the system, or an apparatus, a storage medium on which is stored software program code that implements the functions of the above embodiments, so that the computer of the system, or of the apparatus, can read and execute the program code that is stored on the storage medium.

In this case, the program code read from the recording medium implements the functions of the embodiments, and the storage medium embodies the present invention.

The storage medium for supplying program code is, for example, a floppy disk, a hard disk, an optical disk, a magneto optical disk, a CD-ROM, a CD-R, a magnetic tape, a nonvolatile memory card or a ROM.

Since the program code is read and executed by the computer, included is not only a case where the functions of the above embodiments are accomplished, but also a case where an OS running on the computer performs one part or all of the actual processing, in accordance with the instructions contained in the program code, so as to implement the functions of the embodiments.

The present invention has been explained by using the preferred embodiments; however, the present invention is not limited to these embodiments and can be variously modified within the scope of the claims.

What is claimed is:

1. An image output system comprising:
    a connector, arranged to connect a computer to said image output system;
    a receiver, arranged to receive image data and a print condition, regarding a printing form of the image data, through said connector from the computer;
    a memory, arranged to store the image data received by said receiver;
    an outputter, arranged to output the image data to a printer in order to print an image based on the image data in accordance with the print condition; and
    a changer, arranged to change the print condition received by said receiver while the image data is stored in said memory, irrespective of whether or not the printer is able to print the image based on the image data in accordance with the print condition,
    wherein the print condition is changed after the printer completes the print operation of the image data.

2. A system according to claim 1,
    wherein said connector connects said image output system to a network to which is connected a plurality of computers, and
    wherein said receiver receives the image data and the print condition from one of the plurality of computers connected via said connector.

3. A system according to claim 1, further comprising an operation unit, arranged to enter a manual instruction from an operator, wherein said changer changes the print condition based on the manual instruction entered via said operation unit.

4. A system according to claim 1, wherein said outputter outputs the image data to an external printer.

5. A system according to claim 1, wherein said changer changes the print condition irrespective of whether or not an image corresponding to the print condition has already been printed.

6. A system according to claim 1, wherein the print condition is irrelevant to an image quality of the image printed by the printer.

7. A system according to claim 6, wherein the print condition is for causing a sheet on which the image is printed by the printer to be stapled.

8. A system according to claim 6, wherein the print condition is for causing the printer to print the image on both sides of a sheet.

9. A system according to claim 1, further comprising an inputter, arranged to input image data from a reader that reads an original image and generates the image data based on the image, wherein said outputter outputs the image data inputted by said inputter.

10. A control method of an image output system connected a computer, said method comprising:
    a receiving step of receiving image data and a print condition, regarding a printing form of the image data, from the computer;
    a storing step of storing step of storing the image data received in said receiving step in a memory;
    an outputting step of outputting the image data to a printer in order to print an image based on the image data in accordance with the print condition; and
    a changing step of changing the print condition received in said receiving step while the image data is stored in said memory, irrespective of whether or not the printer is able to print the image based on the image data in accordance with the print condition,
    wherein the print condition is changed after the printer completes the print operation of the image data.

11. A computer-readable storage medium storing a program for implementing a control method of an image output system, the method comprising:
    a receiving step of receiving image data and a print condition, regarding a printing form of the image data, from a computer;
    a storing step of storing the image data received in said receiving step in a memory;
    an outputting step of outputting the image data to a printer in order to print an image based on the image data in accordance with the print condition; and
    a changing step of changing the print condition received in said receiving step while the image data is stored in the memory, irrespective of whether or not the printer is able to print the image based on the image data in accordance with the print condition, wherein the print condition is changed after the printer completes the print operation of the image data.

12. An image output system comprising:

a connector, arranged to connect a plurality of computers to said image output system via a network;

a receiver, arranged to receive image data and a print condition through said connector from one of the plurality of computers;

a memory, arranged to store the image data received by said receiver;

an outputter, arranged to output the image data to a printer in order to print an image based on the image data in accordance with the print condition;

an operation unit, arranged to enter a manual instruction, regarding printing of the image, to the printer without using said connector; and a changer, arranged to change the print condition received by said receiver while the image data is stored in said memory, based on the manual instruction entered through said operation unit, wherein the print condition is changed after the printer completes the print operation of the image data.

13. A system according to claim 12, wherein said changer changes the print condition irrespective of whether or not an image corresponding to the print condition has already been printed.

14. A system according to claim 12, wherein the print condition is irrelevant to an image quality of the image printed by the printer.

15. A system according to claim 12, wherein the print condition is for causing a sheet on which the image is printed by the printer to be stapled.

16. A system according to claim 12, wherein the print condition is for causing the printer to print the image on both sides of a sheet.

17. A system according to claim 12, further comprising an inputter, arranged to input image data from a reader that reads an original image and generates the image data based on the image, wherein said outputter outputs the image data inputted by said inputter.

18. A control method of an image output system to which a plurality of computers are connected by a connector through a network, said method comprising:

a reception step of receiving image data and a print condition through the connector from one of the plurality of computers;

a storage step of storing in a memory the image data received in said reception step;

an output step of outputting the image data to a printer in order to print an image based on the image data in accordance with the print condition;

an operation step of entering a manual instruction, regarding printing of the image, to the printer without using the connector; and a change step of changing the print condition received in said reception step while the image data is stored in the memory, based on the manual instruction entered in said operation step, wherein the print condition is changed after the printer completes the print operation of the image data.

19. A computer-readable program product embodying a program for implementing a control method of an image output system to which a plurality of computers are connected by a connector through a network, the method comprising:

a reception step of receiving image data and a print condition through the connector from one of the plurality of computers;

a storage step of storing in a memory the image data received in said reception step;

an output step of outputting the image data to a printer in order to print an image based on the image data in accordance with the print condition;

an operation step of entering a manual instruction, regarding printing of the image, to the printer without using the connector; and a change step of changing the print condition received in said reception step while the image data is stored in the memory, based on the manual instruction entered in said operation step, wherein the print condition is changed after the printer completes the print operation of the image data.

* * * * *

UNITED STATES PATENT AND TRADEMARK OFFICE
CERTIFICATE OF CORRECTION

PATENT NO.     : 6,701,384 B1
DATED          : March 2, 2004
INVENTOR(S)    : Shigenori Fukuta It is certified that error appears in the above-identified patent and that said Letters Patent is hereby corrected as shown below:

Title page,
Item [56], References Cited, FOREIGN PATENT DOCUMENTS, "JP 407223341 A * 8/1995" should read -- JP 7-223341 A * 8/1995--

Drawings,
SHEET 6, Fig. 6, "CORY" should read -- COPY --.
SHEET 8, Fig. 8, "CORY" should read -- COPY --.

Column 1,
Line 47, "can not" should read -- cannot --; and
Line 57, "above described" should read -- above-described --.

Column 4
Line 21, "above described" should read -- above-described --.

Column 6,
Line 25, "above described" should read -- above-described --.

Column 7,
Line 17, "has," should read -- has --.

Column 8,
Line 66, "during" should be deleted.

Column 9,
Line 52, "above described" should read -- above-described --.

Column 11,
Line 55, "Iraster" should read -- raster --.

Column 12,
Line 2, "during" should be deleted; and
Line 60, "above described" should read -- above-described --.

UNITED STATES PATENT AND TRADEMARK OFFICE
CERTIFICATE OF CORRECTION

PATENT NO. : 6,701,384 B1
DATED : March 2, 2004
INVENTOR(S) : Shigenori Fukuta

It is certified that error appears in the above-identified patent and that said Letters Patent is hereby corrected as shown below:

Column 16,
Line 38, "nected" should read -- nected to --; and
Line 42, "step of storing" (second occurrence) should be deleted.

Signed and Sealed this

Twenty-first Day of September, 2004

JON W. DUDAS
*Director of the United States Patent and Trademark Office*